INVENTOR.
OSCAR STEINER

Oct. 4, 1955 O. STEINER 2,719,468
VIEWFINDER FOR PHOTOGRAPHIC CAMERAS
Filed July 26, 1951 2 Sheets-Sheet 2

INVENTOR.
OSCAR STEINER
BY
ATTORNEY

United States Patent Office 2,719,468
Patented Oct. 4, 1955

2,719,468

VIEWFINDER FOR PHOTOGRAPHIC CAMERAS

Oscar Steiner, Rochester, N. Y., assignor to Graflex, Inc., Rochester, N. Y., a corporation of Delaware Application July 26, 1951, Serial No. 238,599

3 Claims. (Cl. 95—11)

The present invention relates to viewfinders for photographic cameras and more particularly to a viewfinder for a photographic camera having a back which is rotatable to position the exposure aperture and the film behind it for either a horizontal or a vertical picture. In a more specific aspect, the invention relates to a viewfinder for a reflex type camera having a rotatable back and exposure aperture plate.

Some types of cameras have two viewfinders appropriately masked, one for use when the camera is in vertical position and the other for use when the camera is in horizontal position. Some types of cameras have a rotatably adjustable viewfinder which may be adjusted from horizontal to vertical position, and vice versa, in accordance with the picture-taking position of the camera, and which is suitably framed so that the photographer can readily determine the field of the picture in either position.

It is difficult to use a reflex type camera in other than a vertical picture-taking position. Nevertheless it is sometimes desirable to take a picture with a reflex type camera that has a greater horizontal than vertical dimension. For this reason reflex cameras have been equipped with rotatable backs, the back being rotatably adjustable to either vertical or horizontal position in accordance with the view which it is desired to photograph. Heretofore, the photographer has had to use his own judgment, when the back was in horizontal picture-taking position, as to whether the camera was positioned to get the desired horizontal picture.

A primary object of the present invention is to provide a viewfinder for a reflex type camera which will show the photographer the exact field of the picture which his camera is positioned to take, whether the back be in horizontal or vertical picture-taking position.

Another object of the invention is to provide a viewfinder for a reflex type camera which will mask out of the viewfinder everything except the field of the picture which is to be taken, whether the camera back be in horizontal or in vertical position.

A further object of the invention is to provide a viewfinder having means for automatically masking the field for both horizontal and vertical position of the back, which means is automatically shiftable when the camera back is rotated from horizontal to vertical position, or vice versa.

Other objects of the invention will be apparent hereinafter from the specification and from the recital of the appended claims.

Figure 1:
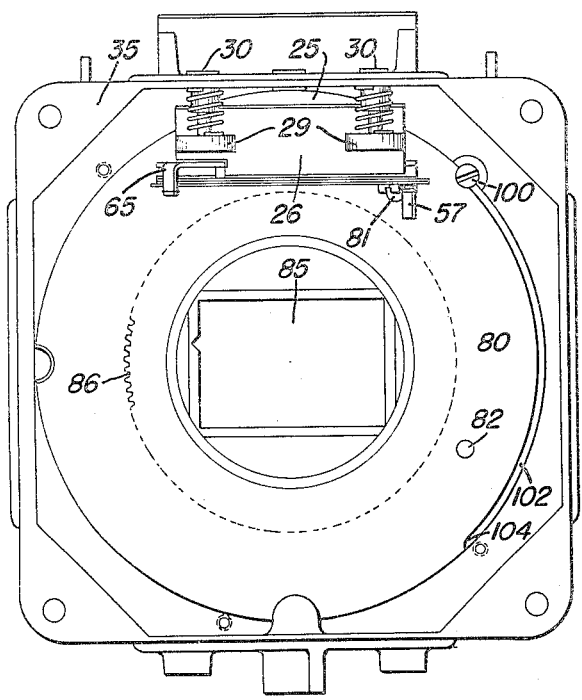
Fig. 1 is a view looking at the rear of the body portion of a reflex type camera equipped with a viewfinder constructed according to one embodiment of the present invention, and showing the exposure aperture plate of this camera in horizontal position.

The reflex type camera shown in the drawings is of the general type disclosed in the King and Berlant U. S. Patent No. 2,550,698, granted May 1, 1951. This camera has an inner housing 10 (Fig. 3) which is formed with an inclined baffle plate 11, against which the shutter plate 12 of the camera is adapted to seat when the shutter is closed. The shutter is hingedly mounted in the housing 10 upon a shaft 14. Pivotally mounted upon the shaft 14, also, is a mirror 15 which is connected to the shutter plate 12 by a detachable catch 16. The shutter plate 12 and mirror 15 are adapted to be moved upwardly by a spring (not shown), as described in the King and Berlant patent, when the camera trigger is tripped to take a picture; and when the two have reached upper position, the shutter plate 12 is disconnected from the mirror 15 and returned to its lower operative position by a spring 18 which is interposed between the shutter plate and mirror. The shutter mechanism forms no part of the present invention and may be such as described in Patent No. 2,550,698.

The viewfinder is mounted in the upper part of the body portion 35 of the camera above the mirror 15 in position to permit viewing the image on the mirror 15 through the rectangular aperture 19 in the upper wall 20 of the inner housing 10.

Figure 5:
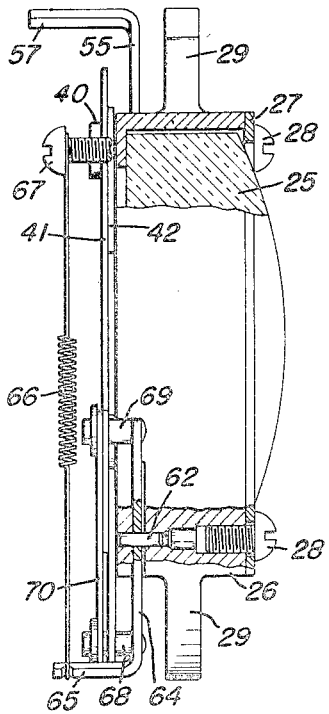
Fig. 5 is a part section, part side elevation of the viewfinder.

The viewfinder comprises a magnifying lens 25 which is mounted in a rectangular frame 26 that is open at top and at bottom. The lens 25 is held in this frame by a bezel 27 (Fig. 5) which is secured to the frame by screws 28. The bezel has a generally cruciform-shaped opening in it, as clearly shown in Fig. 4, to provide a frame for either a vertical or horizontal image.

The frame 26 has three lugs or ears 29 integral with it and projecting laterally from it. These ears are adapted to receive the studs 30 by means of which the viewfinder is suspended from the camera body 35. Coil springs 36, which surround the studs and which are interposed between the body 35 and the lugs 29, serve to cushion the lens against transmission of shock from the camera body to the lens.

Figure 6:
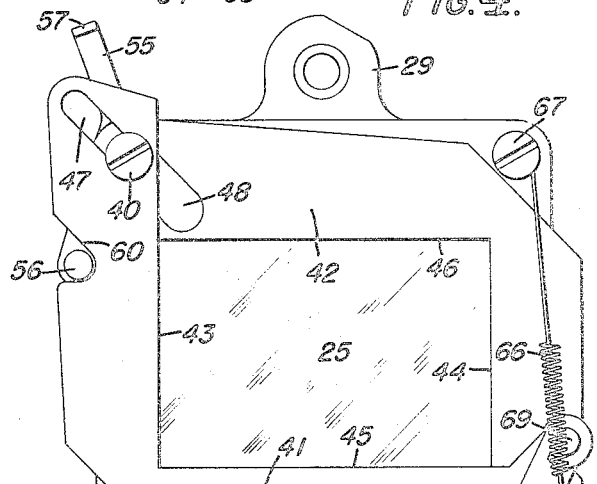
Fig. 6 is a bottom plan view of the viewfinder showing the masking device positioned to take a horizontal picture.
Figure 7:
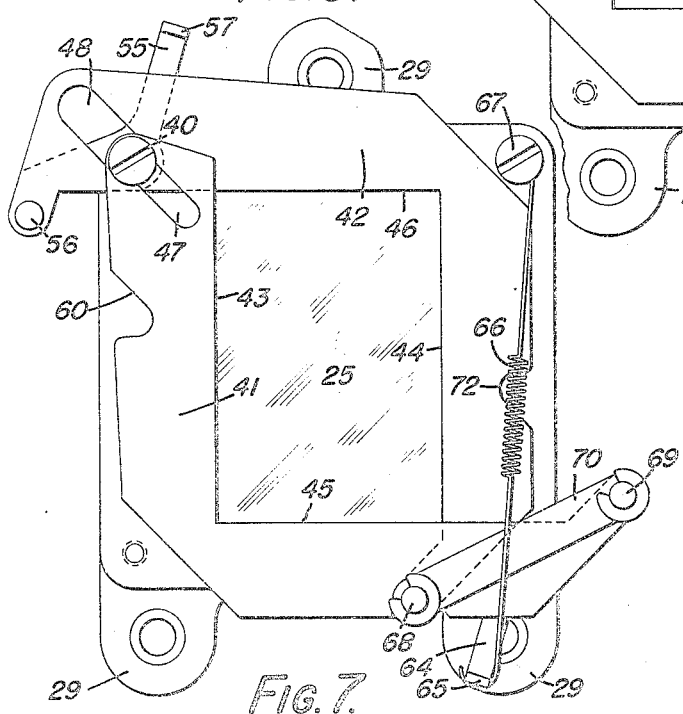
Fig. 7 is a similar view showing the masking device moved to position for taking a vertical picture.

Secured in the bottom of the frame or cell 26 at one corner thereof is a screw 40 (Figs. 6 and 7). This screw which is in axial alignment with one of the screws 28, serves as a guide for the bottom leaf 41 and the top leaf 42 of the masking device. Each leaf is generally L-shaped. The inside surfaces 43 and 45 of the two legs of the leaf 41 form two sides of a variable rectangular viewing opening for the lens 25. The inside surfaces 44 and 46 of the leaf 42 form the other two sides of this viewing opening. Sides 43 and 44 of the two leaves are parallel and sides 45 and 46 of the two leaves are parallel. Leaf 41 has a diagonal slot 47 in one corner through which the screw 40 passes. Leaf 42 has a diagonal slot 48 in the corresponding corner through which the screw 40 also passes.

Pivotally mounted upon the screw 40 is an actuating lever 55. This lever, which is pivoted between its ends, carries at one end a pin 56; and it is bent downwardly at its other end as denoted at 57. The downturned end 57 of the actuating arm 55 is positioned to be engaged and moved in one direction or the other when the back of the camera is rotated from one position to the other to take a horizontal or a vertical picture. The pin 56 serves to connect the lever 55 with one leg of the masking leaf 42.

Figure 4:
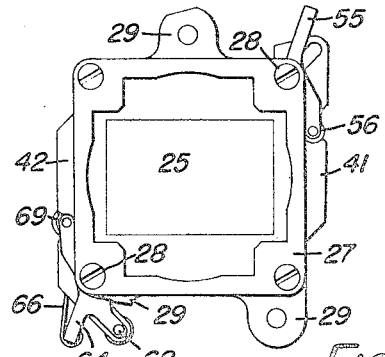
Fig. 4 is a top plan view of the viewfinder.

Mounted upon a pin 62 that has a pressed fit in the cell or frame 26 (Fig. 5) is a three-armed lever 64 (Fig. 4). This lever has a downturned arm 65 which is connected by means of a coil spring 66 with a screw 67 that threads into the cell or frame 26. It has another arm which carries a pin 68 that serves as a support for one end of a link or stablizer 70 and that serves, also, to connect the lever with one leg of the masking leaf 42. It has still a third arm which carries a pin 69 which serves as a support for the other end of the stablizer 70 and also to connect the lever 64 with one leg of the masking leaf 41.

The actuating lever 55 is adapted to be rocked about its pivot pin 40 to move the masking leaves 41 and 42 from the position shown in Fig. 6 to that shown in Fig. 7, and vice versa. In the position shown in Fig. 6 the pin 56 engages in a notch 60 in one leg of the masking leaf 41. Pin 69 is adapted to engage in a notch 72 in the leaf 42 when the parts are in the position shown in Fig. 6. Pin 68 is adapted to engage in a notch 73 in the leaf 41 when the parts are in the position shown in Fig. 7.

The camera back is not illustrated in detail since it may be of conventional construction, for instance, as disclosed in Patent No. 2,550,698 above mentioned. In the camera illustrated, 80 (Figs. 1, 2 and 3) denotes the plate which is rotatable in the camera body 35 and which is connected through any suitable means to rotate with the camera back. This plate has two pins 81 and 82 secured to it which are 90° apart and which are positioned at the correct radial distance from the axis of rotation of the plate 80 to engage the downturned end 57 of the actuating arm of the masking device. Mounted centrally within an opening in the rotary plate 80 and secured to the rotary plate 80 to rotate therewith is an aperture plate 84 which is provided centrally with a rectangular frame opening 85. Fastened to the aperture plate 84 is a gear 86 which forms part of the film transport mechanism but constitutes no part of the present invention.

The plate 80 is held on the camera body surface by a gib 88. The plate 80 is locked in either of its positions of adjustment, namely, with the exposure aperture 85 horizontal (Fig. 1) or vertical (Fig. 2) by a locking dog or detent 90 (Fig. 3). This detent is slidably housed within a lug 92 formed on the camera body 35. It is normally spring-pressed into locking position by a coil spring 93. It has an enlarged head 94 which has a conical shaped periphery and which is adapted to engage in one or other of two correspondingly shaped recesses or kerfs 95 (Fig. 2) formed on the periphery of the plate 80. A pin 96 (Fig. 3) that is secured in the detent 90 is provided to permit manual disengagement of the detent from the plate 80. A button 97 that is slidably mounted in the camera frame 98 may be provided to engage the pin 96, when pressed forwardly, to disengage the detent 90.

A stop pin 100 (Fig. 1) is provided to limit the movement of the plate 80 in opposite directions. The periphery of the plate 80 is formed with an arcuate groove 102 that extends for 90° around the periphery of plate 80; and the pin 100 is positioned to engage the shoulders 103 and 104 formed on the periphery of the plate at opposite ends of the groove 102, thereby to limit movement of plate 80 in opposite directions.

From the preceding description it will be seen that, when the plate 80 is rotated in one direction, the pin 82 carried by the plate 80 engages the downturned end 57 of the actuating lever 55 rocking the lever 55 from the position shown in Fig. 6 to the position shown in Fig. 7. In this movement the leaf 42 is moved upwardly and to the left by lever 55. This causes the pin 68, which is connected at one end to one leg of the leaf 42, to rock the lever 64 and the stabilizer link 70 clockwise as viewed in Figs. 6 and 7. This causes the leaf 41, to which the stabilizer link 70 is connected by pin 69, to be displaced downwardly and to the right. This movement is aided by coil spring 66 which is connected with the downturned arm 65 of lever 64. Thus, the frame formed by the two masking leaves 41 and 42 is shifted to provide instead of the horizontal opening of Fig. 6 the vertical opening of Fig. 7. The pin 40 serves to guide this movement traveling from the lower end of the slot 47 in the leaf 41 to the upper end thereof and from the upper end of the slot 48 in the leaf 42 to the lower end thereof.

Figure 2:
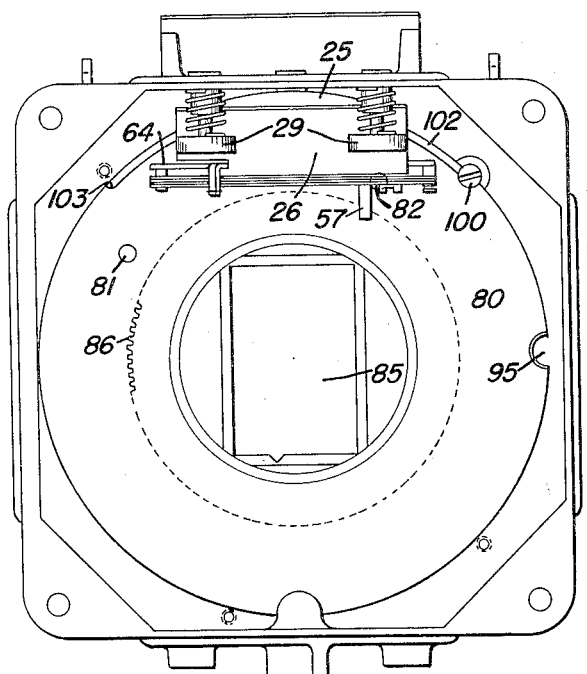
Fig. 2 is a similar view showing the exposure aperture plate rotated to a vertical position and illustrating how the masking device of the viewfinder of the present invention is tripped automatically by the back in its movement to mask the field automatically for the position of the back.
Figure 3:
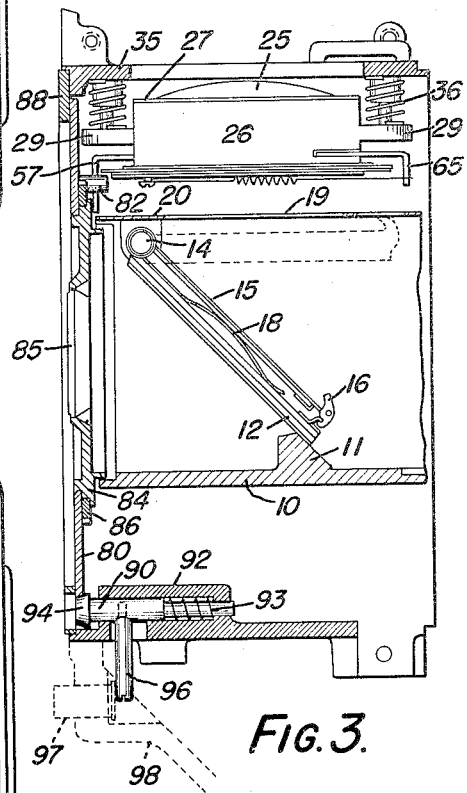
Fig. 3 is a vertical section through the body portion of this camera.

When the back is rotated back to move the exposure aperture 85 back from the position shown in Fig. 2 to that of Fig. 1 the pin 81 engages the actuating lever 55 and rocks the parts of the masking device back to the position shown in Fig. 6. In this instance, masking leaf 42 will be moved downwardly and to the right by lever 55 while masking leaf 41 is being moved upwardly and to the left through operation of lever 64 and of stabilizer link 70, which connects the two leaves, and through aid of spring 66. The coil spring 66 assists as a spring-operated loading mechanism in the shifting of the two masking leaves.

From the preceding description it will be seen, then, that the masking device is shifted automatically when the aperture opening of the camera is shifted so that automatically the field is framed in the viewfinder in accordance with the horizontal or vertical position of the aperture opening, with the result that the photographer is able to view in the viewfinder the exact field of the picture which is to be taken.

While the invention has been described in connection with a viewfinder for reflex type cameras, it is to be understood that it is not limited to use on such cameras. While the invention has been described, then, in connection with a specific embodiment thereof and a specific use therefor, it is to be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A viewfinder for photographic cameras comprising a support, a pair of generally L-shaped masking members, each of said masking members having two legs at right angles to one another, the legs of one of said masking members forming two sides of a rectangular frame for the field of view and the legs of the other of said masking members forming the other two sides of said rectangular frame, an actuating lever pivotally mounted intermediate its ends on said support and pivotally connected adjacent one end to one leg of one of said masking members to move said one masking member on movement of said actuating member, a second lever pivotally mounted intermediate its ends on said support and having two arms, means directly pivotally connecting one of said arms to the other leg of said one masking member, means directly pivotally connecting the other of said arms to one leg of the other masking member, a rigid link connected at opposite ends to the two last-named pivotal means, each of said masking members having an elongated straight slot therein which is equiangularly inclined to both its legs, said slots registering with one another, and a pin secured to said support and engaging in both said slots to guide said masking members in their movements.

2. A viewfinder for photographic cameras comprising a support, a pair of generally L-shaped masking members, each of said masking members having two legs at right angles to one another, the legs of one of said masking members forming two sides of a rectangular frame for the field of view and the legs of the other of said masking members forming the other two sides if said rectangular frame, an actuating lever pivotally mounted intermediate its ends on said support and pivotally connected adjacent one end to one leg of one of said masking members to move said one masking member on movement of said actuating member, a second lever pivotally mounted intermediate its ends on said support and having two arms which are directly pivotally connected, respectively, to the other leg of said one masking member and to one leg of the other masking member, each of said masking members having an elongated straight slot therein which is equiangularly inclined to both its legs, said slots registering with one another, and a pin secured to said support and engaging in both said slots to guide said masking members in their movements, and a coil spring secured at one end to said second lever and at its opposite end to said support to spring load said second lever to completion of its movement in either direction.

3. In a reflex camera, a plate that is formed centrally with an oblong exposure aperture and that is rotatable through an angle of ninety degrees to move said exposure aperture from a horizontal to a vertical position, a viewfinder positioned above said exposure aperture with its optical axis at right angles to the axis of rotation of said plate, means for framing a rectangular field of view for said viewfinder comprising two generally L-shaped masking members that are contiguous and that lie in planes perpendicular to the plane of rotation of said plate, each of said masking members having two legs at right angles to one another, the legs of one of said masking members forming two sides of a rectangular frame for the field of view and the legs of the other of said masking members forming the other two sides of said rectangular frame, a movable actuating member, means operatively connecting said actuating member to said masking members to move said masking members simultaneously in opposite directions, respectively, both longitudinally and transversely of said frame on movement of said actuating member when said actuating member is moved in either direction, and two spaced trip members mounted on said plate and spaced ninety degrees apart about the axis of rotation of said plate and positioned, respectively, to engage and move said actuating member in opposite directions, respectively, on movement of said exposure aperture from a horizontal to a vertical position, and vice versa, whereby to change the frame for the field of view from horizontal to vertical and vice versa in correspondence with the shift in position of said exposure aperture caused by rotation of said plate.

References Cited in the file of this patent

UNITED STATES PATENTS

| | | |
|---|---|---|
| 2,157,548 | Leitz | May 9, 1939 |
| 2,187,246 | Nerwin | Jan. 16, 1940 |
| 2,334,329 | Isaacson | Nov. 16, 1943 |

FOREIGN PATENTS

| | | |
|---|---|---|
| 27,667 | Great Britain | of 1909 |